US012183193B2

(12) United States Patent
Rigby et al.

(10) Patent No.: US 12,183,193 B2
(45) Date of Patent: Dec. 31, 2024

(54) PORTABLE TRAFFIC MANAGEMENT SYSTEM

(71) Applicant: ARROWES IP HOLDINGS PTY LTD, Red Hill Brisbane (AU)

(72) Inventors: William Patrick Patton Rigby, Red Hill Brisbane (AU); Samantha Louise Michelle Eltringham, Red Hill Brisbane (AU); Ly Eng Ea, Red Hill Brisbane (AU); Chunbin Zhang, Red Hill Brisbane (AU); Heng Tri La, Red Hill Brisbane (AU); Keang Kok Ea, Red Hill Brisbane (AU)

(73) Assignee: ARROWES IP HOLDINGS PTY LTD, Red Hill Brisbane (AU)

( * ) Notice: Subject to any disclaimer, the term of this patent is extended or adjusted under 35 U.S.C. 154(b) by 0 days.

(21) Appl. No.: 17/923,298

(22) PCT Filed: May 5, 2021

(86) PCT No.: PCT/AU2021/050416
§ 371 (c)(1),
(2) Date: Nov. 4, 2022

(87) PCT Pub. No.: WO2021/222983
PCT Pub. Date: Nov. 11, 2021

(65) Prior Publication Data
US 2023/0237903 A1 Jul. 27, 2023

(30) Foreign Application Priority Data
May 5, 2020 (AU) ................. 2020901428

(51) Int. Cl.
*G08G 1/0955* (2006.01)
*G08B 5/00* (2006.01)
(Continued)

(52) U.S. Cl.
CPC .......... *G08G 1/0955* (2013.01); *G08B 5/006* (2013.01); *G08C 17/02* (2013.01); *G08G 1/0116* (2013.01);
(Continued)

(58) Field of Classification Search
CPC .. G08G 1/0955; G08G 1/0116; G08G 1/0175; G08G 1/04; G08G 1/054; G08B 5/006; G08C 17/02; H04W 4/90
See application file for complete search history.

(56) References Cited

U.S. PATENT DOCUMENTS

| | | | |
|---|---|---|---|
| 2011/0043378 A1* | 2/2011 | Bailey | G08G 1/07 340/917 |
| 2016/0202355 A1 | 7/2016 | Liu et al. | |

(Continued)

FOREIGN PATENT DOCUMENTS

| | | | | |
|---|---|---|---|---|
| EP | 2840556 A2 * | 2/2015 | | B60Q 1/26 |
| GB | 2457668 A | 8/2009 | | |

(Continued)

*Primary Examiner* — Curtis A Kuntz
*Assistant Examiner* — James E Munion
(74) *Attorney, Agent, or Firm* — Finnegan, Henderson, Farabow, Garrett & Dunner, LLP

(57) ABSTRACT

The present invention relates to a portable traffic management system comprising a portable traffic signal assembly; a portable signal assembly; and a control unit in wireless communication with the portable traffic signal assembly and the portable signal assembly. The present invention alleviates one or more of the problems associated with the presently available traffic management systems.

15 Claims, 10 Drawing Sheets

(51) Int. Cl.
*G08C 17/02* (2006.01)
*G08G 1/01* (2006.01)
*G08G 1/017* (2006.01)
*G08G 1/04* (2006.01)
*G08G 1/054* (2006.01)
*H04W 4/90* (2018.01)

(52) U.S. Cl.
CPC ............ *G08G 1/0175* (2013.01); *G08G 1/04* (2013.01); *G08G 1/054* (2013.01); *H04W 4/90* (2018.02)

(56) References Cited

U.S. PATENT DOCUMENTS

| | | |
|---|---|---|
| 2017/0061791 A1 | 3/2017 | Cherewka |
| 2017/0154524 A1* | 6/2017 | Beaulieu ................. E01F 9/662 |
| 2017/0263119 A1 | 9/2017 | Campbell et al. |
| 2021/0049904 A1* | 2/2021 | Zavesky .......... G08G 1/096783 |

FOREIGN PATENT DOCUMENTS

| | | | |
|---|---|---|---|
| KR | 20210018357 A | * | 2/2021 |
| WO | 2019/069104 A | | 4/2019 |

\* cited by examiner

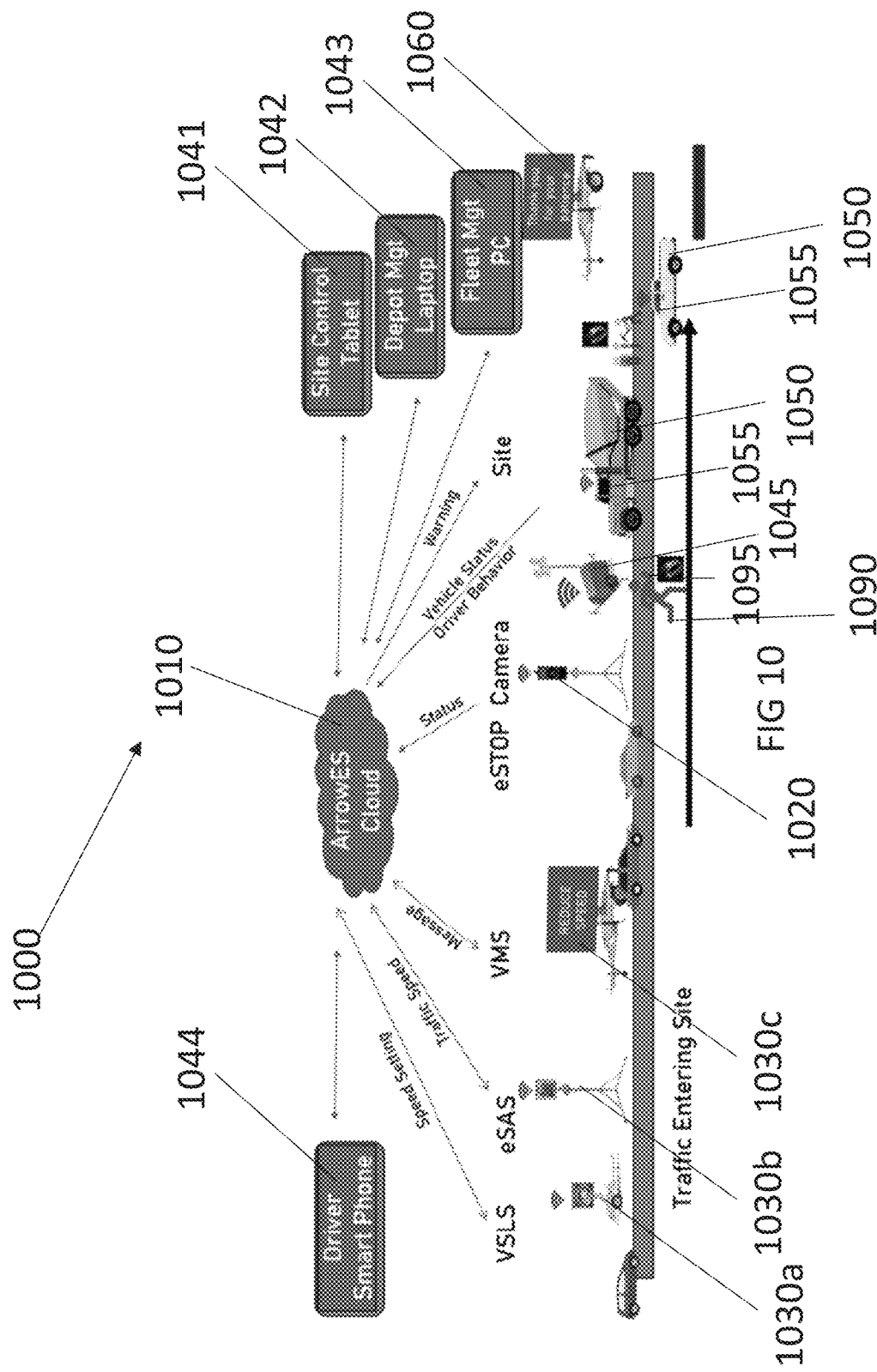

PORTABLE TRAFFIC MANAGEMENT SYSTEM

CROSS-REFERENCE TO RELATED APPLICATIONS

This application is a national phase application of International Application No. PCT/AU2021/050416, filed May 5, 2021, and claims the priority of Australian Application No. 2020901428, filed May 5, 2020, the contents of both of which are incorporated herein by reference.

FIELD OF THE INVENTION

The present invention relates to the field of traffic management. More particularly, the invention relates, but is not limited, to a traffic management system.

BACKGROUND TO THE INVENTION

Any reference to background art herein is not to be construed as an admission that such art constitutes common general knowledge in Australia or elsewhere.

Roadworks and/or other construction activities can require management of traffic flow. In this regard, breaks in traffic may be required to complete certain tasks. As such, management of traffic is required for both the safety of construction workers and passing motorists.

A solution to this issue is to utilize human traffic controllers. However, the use of a traffic controller is labor intensive because at least one traffic controller must be present at all times. In addition to this, the traffic controller must be present regardless of the weather conditions. As a result, traffic controllers may experience heat stroke and dehydration due to extreme and/or prolonged exposure to weather. Other solutions include traffic lights, which are utilized to control traffic flow.

However, with all traffic lights, there is a period of time where a motorist is unsure as to whether they should stop or proceed. Motorists who decide to proceed during this period may be a danger to construction workers and themselves as they may be speeding and/or running a red light. This poses a significant occupational health and safety issue for construction workers.

Furthermore, it will be appreciated that motorists can inadvertently increase the speed of the vehicle to above the speed limit. Motorists who are above the speed limit also pose a danger to themselves and construction workers.

It would be advantageous to alleviate one or more of the above problems or to at least provide the consumer with a commercial alternative to the presently available options.

SUMMARY OF THE INVENTION

In one form, although it need not be the only or indeed the broadest form, the invention resides in a portable traffic management system comprising:
a portable traffic signal assembly adapted to display at least a red light signal or a green light signal;
a portable signal assembly comprising a first detector for detecting
a speed of a vehicle; and
a control unit in wireless communication with the portable traffic signal assembly and the portable signal assembly; wherein the control unit receives a status of the portable traffic signal assembly and the speed of the vehicle and, in response, issues a signal to the portable signal assembly to display a message based thereon.

In an embodiment, the portable traffic signal assembly is adapted to further display a yellow light signal.

In one embodiment, the portable traffic signal assembly, the portable signal assembly and the control unit are all in wireless communication.

In one embodiment, the portable signal assembly is configured to display one or more message(s). In embodiments, the portable signal assembly is configured to display the speed limit, whether a vehicle is compliant to the speed limit, and/or a message for a motorist.

In an embodiment, the portable signal assembly comprises a first detector for detecting the speed of a vehicle. In a further embodiment, the first detector is in wireless communication with the control unit. In one embodiment, the first detector is in communication with the portable signal assembly. In embodiments, the first detector is adapted to send the speed of a vehicle to the control unit.

In some embodiments, the portable traffic signal assembly comprises a second detector for detecting a vehicle running a red light. In a further embodiment, the second detector is in wireless communication with the control unit. In one embodiment, the second detector is in communication with the portable traffic signal assembly. In embodiments, the second detector is adapted to send an indication of a vehicle running a red light to the control unit.

In embodiments, the portable traffic management system further comprises an alarm system. In some embodiments, the alarm system is in wireless communication with the control unit. In further embodiments, the alarm system is configured to issue a warning. In one embodiment, the alarm system forms part of the portable signal assembly. In embodiments, the control unit is adapted to send a signal to the alarm system to issue a warning based on dangerous conditions.

In an embodiment, the portable traffic management system further comprises one or more wearable device(s). In a further embodiment, the one or more wearable device(s) are worn by users. In embodiments, the one or more wearable device(s) are in wireless communication with the control unit and/or the alarm system. In some embodiment, the one or more wearable device(s) are configured to issue a warning. In some embodiments, the one or more wearable device(s) are adapted to send a location thereof to the control unit. In embodiments, the control unit is adapted to send a signal to the one or more wearable device(s) to issue a warning based on dangerous conditions.

In an embodiment, the portable traffic management system further comprises a boom gate. The boom gate is in communication with the portable traffic signal assembly. In one embodiment, the boom gate is in communication with the control unit and/or portable traffic signal assembly. In some embodiments, the boom gate is configured to actuate in response to the portable traffic signal device and/or control unit.

In one embodiment, the portable traffic management system further comprises a remote control. The remote control controls the portable traffic signal assembly. In one embodiment, the remote control is the control unit. In another embodiment, the remote control accesses the control unit. In some embodiments, the control unit is a cloud control unit.

In a further embodiment, the portable traffic signal assembly further comprises an adjustable camera. In one embodiment, the adjustable camera is in communication with the portable traffic signal assembly. In one embodiment, the adjustable camera is in wireless communication with the control unit. In a further embodiment, the adjustable camera transmit images, videos and/or stream to the control unit. The control unit is adapted to display the images, videos and/or stream to a user.

In one embodiment, the alarm system, the portable traffic signal assembly and/or the portable signal assembly further comprise a red light indicator. In one embodiment, the tilt and rotational alarm is in communication with the portable traffic signal assembly.

In an embodiment, the portable traffic signal assembly further comprises a tilt and rotational alarm. In some embodiments, the portable signal assembly is configured to display a particular message and/or messages from signal inputs from components in communication therewith. In one embodiment, the tilt and rotational alarm is in wireless communication with the control unit. In some embodiments, the tilt and rotational alarm is adapted to send a status thereof to the control unit.

In embodiments, the control unit is adapted to receive a number of inputs from the components of the traffic management system. In one embodiment, the control unit is configured information and conditions to determine the messages and/or warnings issued to workers and motorists. In some embodiments, the control unit is configured to send a signal to the portable signal assembly to display a particular message and/or messages. In some embodiments, the portable signal assembly is configured to display a particular message and/or message(s) based on inputs.

In one embodiment, the portable traffic management system further comprises a display assembly. In one embodiment, the display assembly is in communication with a vehicle identification device and a second vehicle identification device. In a further embodiment, the display assembly is in directed communication, or hardwired, with the vehicle identification device. In an embodiment, the display assembly is in wireless communication with the second vehicle identification device. The display assembly is configured to calculate a wait time. The display assembly is configured to display the wait time. The display assembly may also be configured to display a message regarding traffic conditions. The display assembly may be in wireless communication with the control unit.

In embodiments, the portable traffic management system further comprises a location determining device adapted to attach to a third party vehicle. In some embodiments, the location determining device is in wireless communication with the control unit. In an embodiment, the location determining device is configured to collect location data and/or movement data of the third party vehicle and transmit the data to the control unit.

In an embodiment, all components of the portable traffic management system are in wireless communication.

The various features and embodiments of the present invention referred to in the individual sections above and in the description which follows apply, as appropriate, to other sections, mutatis mutandis. Consequently, features specified in one section may be combined with features specified in other sections as appropriate.

Further features and advantages of the present invention will become apparent from the following detailed description.

BRIEF DESCRIPTION OF THE DRAWINGS

To assist in understanding the invention and to enable a person skilled in the art to put the invention into practical effect, embodiments of the invention will be described by way of example only with reference to the accompanying drawings, in which:

FIG. 10 shows yet another embodiment of the traffic management system.

DETAILED DESCRIPTION OF THE INVENTION

Figure 1:
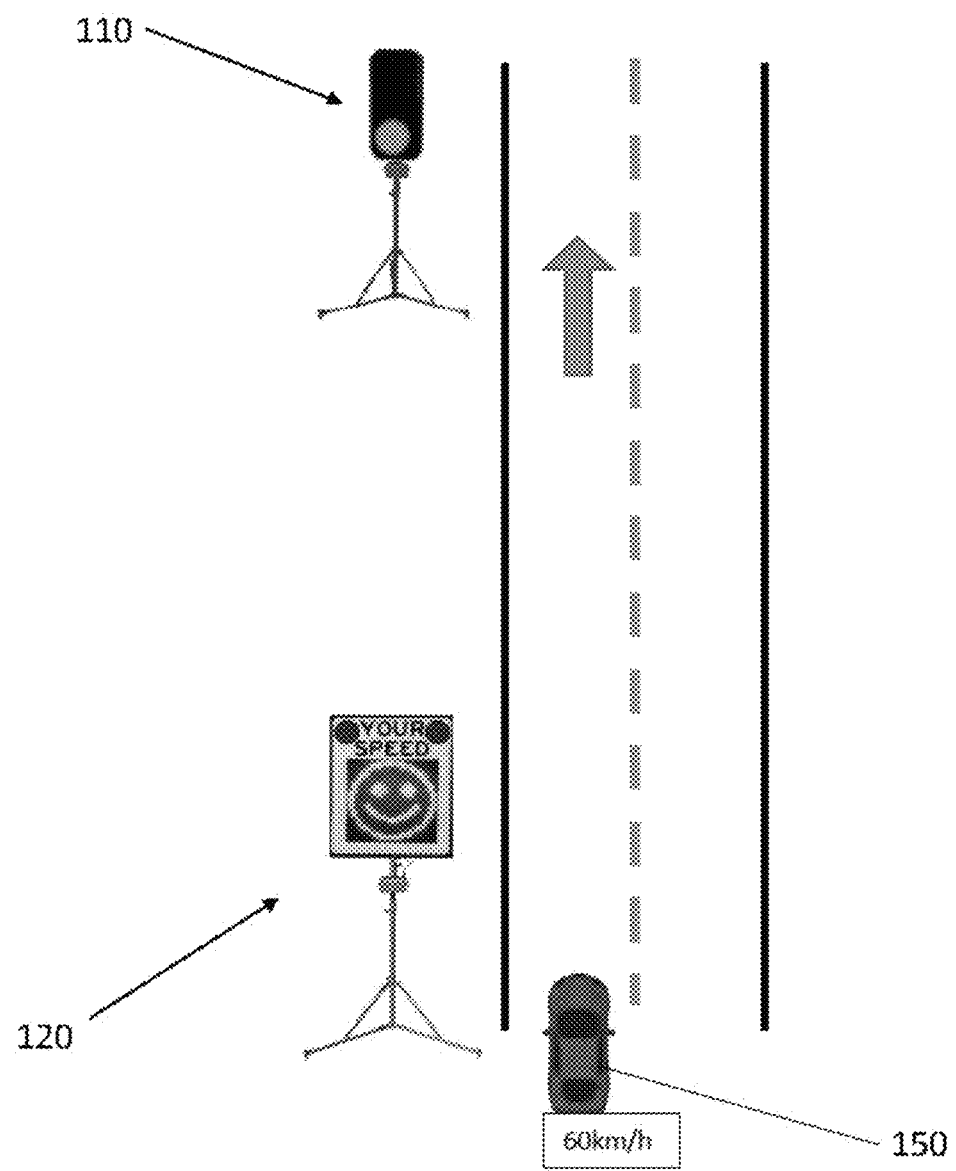
FIG. 1 shows a portable traffic management system comprising a portable signal assembly up road from a portable traffic signal assembly (GO configuration), and an approaching motorist at the speed limit.

Embodiments of the present invention reside primarily in a traffic management system. Accordingly, the system, apparatus, assembly and method have been illustrated in concise schematic form in the drawings, showing only those specific details that are necessary for understanding the embodiments of the present invention so as to not obscure the disclosure with excessive detail that will be readily apparent to those of ordinary skill in the art having the benefit of the present description.

In this specification, adjectives such as first and second, up and down, and the like may be used solely to distinguish one element or action from another element or action without necessarily requiring or implying any actual such relationship or order.

Words such as "comprises" or "includes" are intended to define a non-exclusive inclusion, such that a system, apparatus, assembly or method that comprises a list of elements does not include only those elements but may include other elements not expressly listed, including elements that are inherent to such a system, apparatus, assembly or method.

As used herein, the term 'about' means the amount is nominally the number following the term 'about' but the actual amount may vary from this precise number to an unimportant degree.

During construction, management of traffic flow may be required to create a break in traffic because construction workers may need to complete tasks near or in close proximity to a road. This is required for the safety of construction workers and motorists. A common solution to this problem is to utilize human traffic controllers. However, traffic controllers are labor intensive and it requires at least one traffic controller to be present at all times.

Recently, the use of portable traffic signals (otherwise known as portable traffic lights) have been utilized. This reduces the risk exposure for the traffic controller and reduces possible human error. However, the location of these portable traffic signals may not be easily visible to the motorist because of their location. In this regard, the motorist may not notice or expect the portable traffic signal because they are not routinely located there and, as a result, may inadvertently run a red light or be in a dangerous position to stop.

In one form, although it need not be the only or indeed the broadest form, the invention resides in a portable traffic management system comprising:
 a portable traffic signal assembly adapted to display at least a red light signal or a green light signal;
 a portable signal assembly comprising a first detector for detecting a speed of a vehicle; and
 a control unit in wireless communication with the portable traffic signal assembly and the portable signal assembly; wherein the control unit receives a status of the portable traffic signal assembly and the speed of the vehicle and, in response, issues a signal to the portable signal assembly to display a message based thereon.

The portable traffic signal assembly is generally located up road from the construction site or where a cease in traffic is required. The portable traffic signal assembly is operable between a green light (GO configuration), a red light (STOP configuration) and optionally a yellow light (transitional configuration). The portable traffic signal assembly may comprise a traffic lantern. In one embodiment, the traffic lantern comprises a red light and a green light. In further embodiments, the traffic lantern comprises a yellow light. It will be appreciated that the red, yellow and green lights can be formed of any light emitting devices known to the person skilled in the art. A non-limiting example of a light emitting device is a LED light.

The yellow light may be adapted to display an amount of time (numeral form). In one embodiment, the amount of time is a countdown. The countdown may be divided into a number of integers. For example, in the case of the amount of time available prior to actuation of a green light is 60 seconds, then the countdown may commence from 9 to 0 in intervals of 6 seconds. In one embodiment, the countdown may begin at 9 and end at 0. The countdown may be used to give an indication of the amount of time before a red light. Similarly, in the case of the amount of time available prior to actuation of a red light is 60 seconds, then the countdown may commence from 9 to 0 in intervals of 6 seconds. The person skilled in the art will appreciate that other interval times and countdown numbers can be utilized. It will be appreciated that the red, yellow and green lights can be formed of any light emitting devices known to the person skilled in the art.

This provides motorists with an indication of how much time is available before a red light or green light appears. This alleviates the issue of a motorist being unsure as to the amount of time available before a green light becomes a red light and also alleviates the issue of a motorist missing a green light. As such, the motorist is provided with forewarning of an impending light change and may slow down or maintain speed depending on the amount of time available. This alleviates the issue of a motorist being caught in a situation where they are unsure as to whether they should stop or proceed. In one embodiment, the yellow light indicates the amount of time available prior to a red light. In another embodiment, the yellow light indicates the amount of time available prior to a green light. In one embodiment, the yellow light is operated at the same time as the red light. In another embodiment, the yellow light is operated at the same time as the green light.

The portable traffic signal assembly may also comprise a target board. In one embodiment, the target board is a foldable target board. In one embodiment, the foldable target board comprises a first side section and a second side section; and a top section and a bottom section connecting the first side section to the second side section; wherein the first side section and the second side section are hingedly connected to the top section and the bottom section, wherein the first side, second side, top section and bottom section define an aperture for receiving a traffic lantern. The foldable target board may further comprise a first securing portion.

The foldable target board is able to be detached from a traffic lantern and stored separately. This allows for easier transport and storage thereof. The first securing portion is complementary to a second securing portion. The second securing portion is located on the traffic lantern. The first securing portion and the second securing portion allow for a traffic lantern to be releasably attached or releasably secured to the foldable target board. A non-limiting example of the first securing portion is a bolt hole, and a non-limiting example of the second securing portion is a bolt. The bolt may be inserted into the bolt hole and secured with a securing device. Non-limiting examples of the securing device include nuts and wing nuts.

The control unit can receive multiple signals from the components of the portable traffic management system, and can issue tasks or signals to the portable signal assembly and/or other components. In this regard, the control unit is configured to send a number of signals in response to inputs from the components of the portable traffic management system (mentioned in more detail hereinafter).

Alternatively, the control unit may be in wireless communication with only the portable traffic signal assembly and the portable signal assembly. The portable traffic signal assembly is in turn in communication with other components (mentioned in more detail hereinafter) and transmits the data/information to the control unit wirelessly. The portable signal assembly is also in turn in communication with other components (mentioned in more detail hereinafter) and transmit the data/information to the control unit wirelessly.

The portable signal assembly is located further up road from the portable traffic signal assembly. The portable signal assembly is in wireless communication with the control unit. The portable signal assembly is configured to display one or more messages in response to a signal from the control unit and/or in response to signal(s) from the components in communication therewith. The portable signal assembly displays a particular message in response to a number of inputs from the traffic management system.

In embodiments, the portable signal assembly is configured to display the speed limit, whether a vehicle is compliant to the speed limit, and/or a message for a motorist.

The portable signal assembly may be configured to display a warning of a red light ahead. As the portable signal assembly is in wireless communication with the control unit and the control unit is in communication with the portable traffic signal assembly, the portable signal assembly can be adapted to provide one or more messages or warnings to motorists of the upcoming traffic conditions. In an embodiment, the portable signal assembly displays a message that the portable traffic signal assembly is in a STOP configuration or in a GO configuration. The portable signal assembly may also provide other messages in response to other signals (mentioned in more detail hereinafter).

The portable signal assembly comprises a support assembly adapted to receive a signal device. The signal device is configured to display the one or more messages. The support assembly is adapted to releasably receive the signal device. Preferably, the support assembly is an elongate support assembly. More preferably, the support assembly is a collapsible support assembly.

The support assembly further comprises an upper support member and a lower support member.

The portable traffic light assembly may further comprise a collapsible support assembly adapted to releasably receive the traffic lantern.

The base assembly includes three support legs, three stays and a fastening collar. The fastening collar is located about the lower support member.

The support legs are pivotally coupled to an end of the lower support member and are spaced about the lower support member at approximately 120° relative to each other to provide a stable support. While the embodiments herein have been described as having three (3) support legs, it will be appreciated that additional support legs could be included to further improve stability.

Each leg includes a stay, one end of which is pivotally coupled to the fastening collar. At an opposite end, each stay is pivotally coupled to the centre of its respective leg.

The support legs can be folded vertically by moving the feet of the support legs and the fastening collar along the lower support member. The fastening collar has a fastening screw or other suitable mechanism for locking the fastening collar in place along the lower support member.

An end of the upper support member is received within an end of the lower support member to couple the upper and lower support members together.

The feet comprise hollow cylindrical portions which may receive pegs or other suitable tie-down devices used to secure the base assembly to the ground or a supporting surface.

In one embodiment, one or more of the stays may include two telescoping members: an outer member and an inner member. The inner member is received within the outer member and, in use, one of the adjustable stays can be lengthened by extending the inner member from the end of the outer member or shortened by retracting the inner member to be located within the outer member. In order to lock the adjustable stay in a particular position, the inner member may include a number of apertures which can be aligned with an aperture of the outer member and a locking pin may be inserted through the aligned apertures to lock the stay in place.

The telescoping stay and adjustable length allows the support assembly to be placed on uneven surfaces and still provide the center support member in a substantially vertical/upright orientation so that the portable signal light assembly can be directed toward traffic and vehicles.

The portable signal assembly may further comprise a rechargeable battery located in a receptacle connected to the upper support member. In use, the battery is connected to the signal display to provide power thereto. In some embodiments, the battery may be replaced with solar panels or used in combination with solar panels. In another embodiment, the battery may be replaced with directed power connection to vehicles.

The support assembly is as substantially described in Australian Innovation Patent No. 2020100193 and the contents of which is incorporated herein by reference in its entirety.

The portable signal assembly may further comprise a first detector for detecting a speed of a vehicle. The first detector may be in the form of a RADAR unit for detecting the speed of an approaching vehicle. The first detector may be in communication with at least the portable signal assembly. The first detector may be in wireless communication the control unit. The first detector detects the speed on an approaching vehicle. In one embodiment, the portable signal assembly is configured to compare the speed of the approaching vehicle with a pre-determined speed limit and displays one or more message(s) based on these inputs. In another embodiment, the control unit is configured to compare the speed of the approaching vehicle with a pre-determined speed limit, and sends a signal to the portable signal assembly to display one or more messages. In yet another embodiment, the control unit is adapted to receive the speed of the motorist and issue instructions based on a number of inputs. The portable signal assembly through the signal device is configured to generate one or more graphical display(s) and/or message(s) indicating compliance of the approaching vehicle with the speed limit. In some embodiments, the one or more message(s) indicate whether the approaching vehicle is in accordance with the speed limit or indicate whether the approaching vehicle is not in accordance with the speed limit.

It will be appreciated that the portable signal assembly may display a plurality of messages depending on the configuration on the portable traffic management system. For example, the portable traffic management system may:

1. when the motorist is travelling in accordance with the speed limit and the portable traffic signal assembly is green (GO configuration): display a message indicating that the motorist is travelling in accordance with the speed limit;
2. when the motorist is travelling in accordance with the speed limit and the portable traffic signal assembly is red (STOP configuration): display a message that there is a red light ahead;
3. when the motorist is not travelling in accordance with the speed limit and the portable traffic signal is green (GO configuration): display a message to slow down; or
4. when the motorist is not travelling in accordance with the speed limit and the portable traffic signal is red (STOP configuration): display two messages, one message that informs the motorist to slow down urgently and another message that informs the motorist to also prepare to stop.

In one embodiment, the portable signal assembly is configured to display two messages, switching between the two messages. The person skilled in the art will appreciate that the portable signal assembly is not limited to one or two messages and may display greater than two messages.

The portable traffic signal assembly may further comprise a second detector for detecting a vehicle running a red light. The second detector may be in wireless communication with the control unit. The second detector may be in communication with the traffic signal assembly. The control unit may receive information or signals from the second detector directly or via the portable traffic signal assembly. Upon detecting a vehicle running a red light, the second detector may send a signal to the control unit and/or traffic signal assembly.

The traffic signal assembly is in wireless connection with a control unit, which is suitably in wireless communication with an alarm system. The alarm system is configured to issue a warning if dangerous conditions are detected. The alarm system is adapted to receive a signal of dangerous conditions from the control unit. Such dangerous conditions include, but are not limited to, detection of a vehicle running a red light and excessive vehicle speed. The warning may include, but is not limited to, visual and/or audio warnings. Non-limiting examples of the visual warnings include flashing lights. Non-limiting examples of the audio warnings include sirens and/or sounds. The first and/or second detector may also detect when a vehicle is travelling at a speed in excess of a predetermined excessive speed.

The control unit and/or alarm system and/or first detector and/or second detector may also be in wireless communication with one or more wearable device(s). In one embodiment, only the control unit is in wireless communication with the alarm system, the portable traffic signal assembly, portable signal assembly and one or more wearable device(s). The wearable device(s) are worn by construction workers. Similar to the alarm system, the wearable device(s) are configured to issue a warning of the above possible dangerous conditions. The warning may include, but not limited to, visual, audio and/or tactile warnings. Non-limiting examples of the visual warnings include flashing lights. Non-limiting examples of the audio warnings include sirens and/or sounds. Non-limiting examples of the tactile warning may include a vibration. The wearable devices provide another safety feature for the construction workers. The wearable device may be in the form of a watch or a bracelet. The wearable device(s) are adapted to receive a signal of dangerous conditions from the control unit.

The portable traffic management system may further comprise a boom gate configured to actuate in response to the portable traffic signal assembly. The boom gate may be actuated by the control unit and/or portable traffic signal assembly. In one embodiment, the boom gate is lowered when the portable traffic signal assembly is red (STOP configuration) and the boom gate is raised when the portable traffic signal assembly is green (GO configuration). This provides a further barrier to vehicles running a red light. In one embodiment, the boom gate is in communication with the portable traffic signal assembly.

The portable traffic management system may further comprise one or more red light indicators. The one or more red light indicators may be located on the alarm system, the portable traffic signal assembly and/or the portable signal assembly. In one embodiment, a red light indicator is located on the portable traffic signal assembly. The red light indicators show whether the portable traffic signal assembly is showing a red light (STOP configuration). The red light indicator allows construction workers to see whether the traffic signal assembly is showing a red light and thus allows them to gauge the likelihood of incoming traffic. The red light indicator is widely visible unlike the red light (which is generally directed towards oncoming traffic). The red light indicator may be in wireless communication with the control unit. In one embodiment, the red light indicator is in communication with the portable traffic signal assembly.

The portable traffic management system may further comprise an adjustable camera. In one embodiment, the portable traffic signal assembly and/or the portable signal assembly comprise the adjustable camera. In an embodiment, the portable traffic signal assembly comprises the adjustable camera. In another embodiment, the portable signal assembly comprises the adjustable camera. The adjustable camera may store video clips and/or photos of traffic in memory, such as on a SD card or cloud, for example. The adjustable camera may also store video clips and/or photos remotely so that they can be access remotely.

The portable traffic signal assembly and/or portable signal assembly may also comprise a tilt and rotation alarm. The tilt and rotation alarm provides a warning when the portable traffic signal assembly is tilted or rotated. This informs the operator that a portable traffic signal assembly may have fallen over or is in the wrong orientation. An operator, once informed, may attend to the reorientation of the portable traffic signal assembly. The tilt and rotational alarm may comprise a device that determines a position in relation to cardinal direction, and will actuate upon detecting a change in cardinal direction. In one embodiment, the tilt and rotation alarm is in communication with the portable traffic signal assembly.

The portable traffic signal assembly may further comprise a vehicle detection device. The control unit may be in wireless communication with the vehicle detection device. In one embodiment, the vehicle detection device is in communication with the portable traffic signal assembly. In this regard, the control unit and/or portable traffic signal assembly receives a signal from the vehicle detection device as to whether a vehicle is present at the portable traffic signal assembly.

The portable traffic management system may further comprise a display assembly. The display assembly may be in wireless communication with the control unit. The display assembly may comprises a vehicle identification device. The display assembly may be in communication with the vehicle identification device. In one embodiment, the vehicle identification device is hardwired with the display assembly. The display assembly may also be in wireless communication with a second vehicle identification device. The second vehicle identification is located uproad or downroad from the display assembly. The second vehicle identification device may form part of portable signal device or portable traffic signal device, or may be a discrete device.

The vehicle identification device and the second vehicle identification device are adapted to record unique vehicle credentials. Non-limiting examples of the unique vehicle credentials include license plate numbers, motorist phone IDs or other vehicle specific credentials. The vehicle identification device and second vehicle identification device are configured to send the unique vehicle credentials and other information (such as time) to the display assembly. The display assembly is adapted to process the unique vehicle credentials and time to determine a wait time. The wait time is the estimated time for a vehicle near the end of queue to reach the front of the queue and/or pass the portable traffic signal assembly. The display assembly is adapted to display the wait time. It will be appreciated that the display assembly is generally located near the end of an expected queue.

The display device informs the motorists of the approximate amount of time left in the queue. In one embodiment, the display assembly displays a message such as 'Wait Time: 2 mins' (in this case, the wait time is 2 minutes). This advantageously alleviates the issue of drivers getting frustrated as to not knowing the amount of time that they will be required to remain in the queue. The display assembly may be placed anywhere uproad from the portable traffic signal device. In one embodiment, the display assembly is located between the portable traffic signal device and the portable signal device. In another embodiment, the display assembly is located uproad from the portable signal device. The portable traffic management system may comprise one or more display assemblies.

Upon receiving the unique vehicle credentials from the vehicle identification device and the second vehicle identification device, the display assembly processes these details to determine a wait time.

The display assembly may also be in wireless communication with the control unit. The control unit may send a signal to the display assembly for remote configuration thereof. These signals may include, but are not limited to, the configuration of the portable traffic signal assembly. The display assembly may use this information to determine the wait time. Furthermore, the control unit may monitor the status of the display assembly and wait time, and may also control the selection of messages to be displayed.

The display assembly may be in the form of the portable signal device, with the exception that the display assembly is configured to send messages regarding the wait time in the queue rather than upcoming traffic conditions and compliance with the speed limit. The display assembly may also be configured to inform a motorist of traffic conditions. In this regard, the display assembly may be configured to display the message 'Roadworks Ahead' and/or 'Slow down' if no queue of vehicles is detected.

The control unit may receive the speed of an approaching vehicle from the first detector, the configuration of the portable traffic signal assembly, a signal from the second detector, the adjustable camera, and a predetermined speed limit; and determines the message(s) that is or are to be displayed on the portable signal assembly. The control unit sends a signal or instructions to the portable signal assembly. Alternatively, the portable signal assembly may receive the speed of an approaching vehicle from the first detector, the configuration of the portable traffic signal assembly, a signal from the second detector, the adjustable camera, and a predetermined speed limit; and determines the message(s) that is or are to be displayed thereon.

In one embodiment, the components of the traffic management system are each in wireless and/or wired communication with one another.

The control unit is adapted to receive information and data from the devices of the traffic management system. The control unit is adapted to process this information and issues messages in accordance with rules inputted. The control unit is adapted to send signals to the devices of the traffic management system, based on the inputs, to issue the desired messages to the motorist to promote the optimal driving behaviour.

In one embodiment, the invention resides in any combination of the above features.

The traffic management system may further comprise a location determining device adapted for third party vehicles. In this regard, the location determining device may be fitted to a third party vehicle (for instance, vehicles that are on or near a worksite, such as a concrete mixer). The location determining device is able to determine the location and/or movement of the third-party vehicle and relay this information to the control unit. Each wearable device may be similarly capable of determining the location of each wearable device.

The control unit suitably compares the location of the third party vehicle and the location of one or more of the wearable devices and, if they are in close proximity, may issue signal to the location determining device to issue a warning to the operator of the third party vehicle. This provides forewarning of dangerous conditions. Furthermore, the wearable device may similarly issue a warning to the worker as to the close proximity of the third party vehicle.

In another embodiment, the location determining device is adapted to determine the movement of the third party vehicle. The control unit can receive this information which is then compared to the location of one or more of the wearable devices. The control unit can then issue a signal to either the location determining device and/or one or more of the wearable devices of imminent dangerous conditions.

In one embodiment, the traffic management system may comprise one or more portable traffic signal assemblies and/or one or more portable signal assemblies. In the embodiment where multiple portable signal assemblies are utilized, the speed of the same vehicle may be detected at multiple locations. This provides an indication of driving behaviour and, in response, a message may be displayed on the associated portable signal assembly. For instance, the portable signal assembly may be configured to provide a message that indicates whether the vehicle has increased in speed, whether the vehicle has decreased in speed and may need decrease speed further, or whether the vehicle has slowed to the appropriate speed. The combination of the vehicle detection device and the detector allows for the vehicle speed of the same vehicle to be detected. This allows for driving behaviour to be monitored and an appropriate response be issued.

The control unit may also utilize the location of each component of the traffic management system (e.g., the portable traffic signal assembly and/or portable signal assembly) to determine if dangerous conditions are near a wearable device. In response, the wearable device may issue a warning to the wearer of the wearable device.

Referring to FIGS. 1-4, the nominally speed limit is 60 km/h.

Shown in FIG. 1, a portable traffic signal assembly (110) has been placed up road of a construction site (not shown). The portable traffic signal assembly shows a green light (GO configuration). A portable signal assembly (120) is in wireless communication (via a control unit (not shown)) with the portable traffic signal assembly (110) that is placed up road thereof. As a vehicle (150) approaches the portable signal assembly (120), a first detector detects a speed of the vehicle (150) (in this case, 60 km/hr). The portable signal assembly (120) recognizes that the vehicle is in accordance with the speed limit and recognizes (based on the latest signal from the control unit) that the portable traffic signal assembly (110) is in a green light (GO configuration), and is displays a message denoting that the approaching vehicle is in accordance with the speed limit (as shown, a smiley face).

Figure 2:
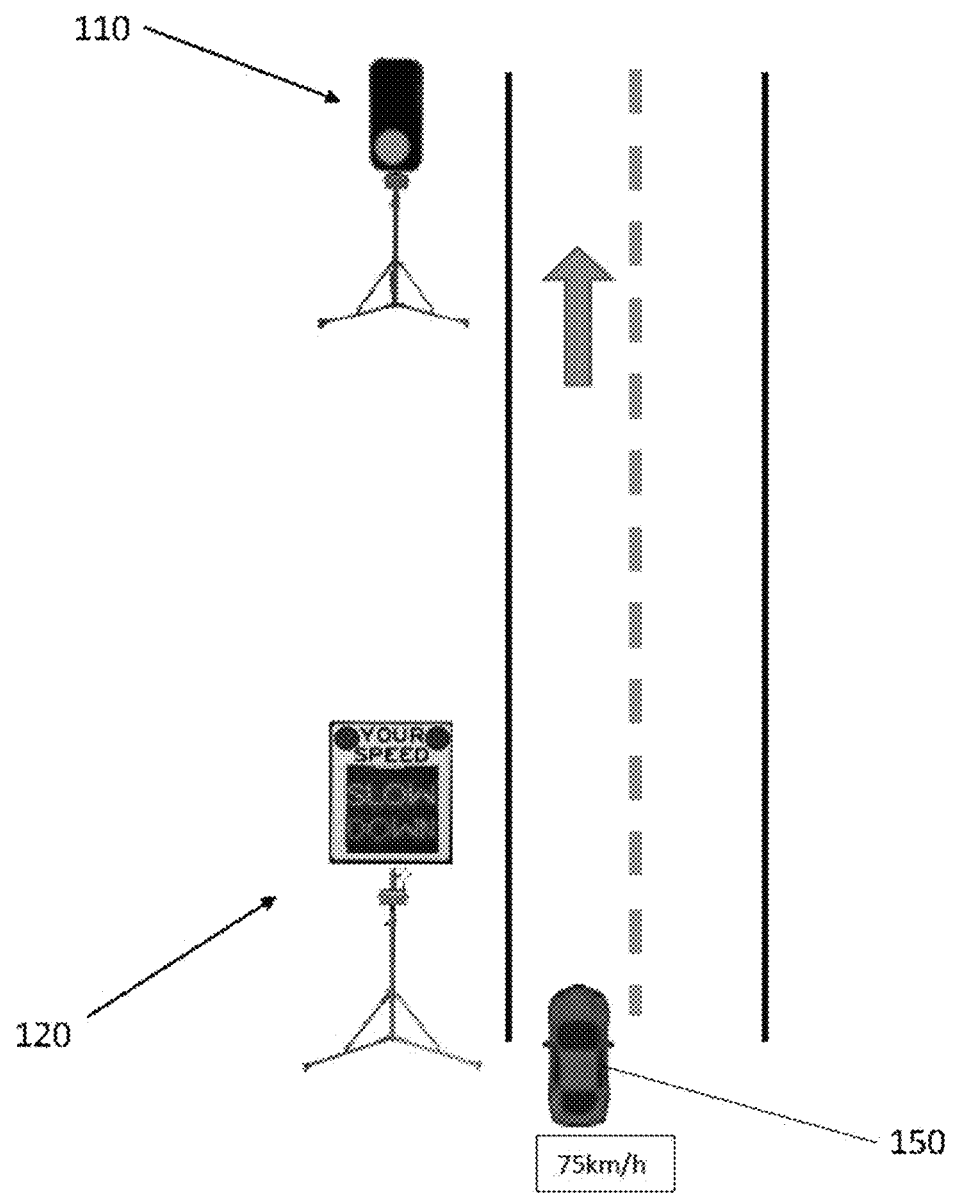
FIG. 2 shows a portable traffic management system comprising a portable signal assembly up road from a portable traffic signal assembly (GO configuration), and an approaching motorist above the speed limit.

Shown in FIG. 2, a similar setup is shown as per FIG. 1. However, in this instance, the vehicle (150) is travelling at 75 km/hr. The portable traffic signal assembly (110) is also in the green light (GO configuration). As a vehicle (150) approaches the portable signal assembly (120), a first detector detects a speed of the vehicle (150) (75 km/hr). The portable signal assembly (120) recognizes that the vehicle is not in accordance with the speed limit and recognizes (based on the latest signal from the control unit) that the portable traffic signal assembly (110) is in a green light (GO configuration), and displays a message that the vehicle is not in accordance with the speed limit (as shown, the message 'SLOW DOWN').

Figure 3:
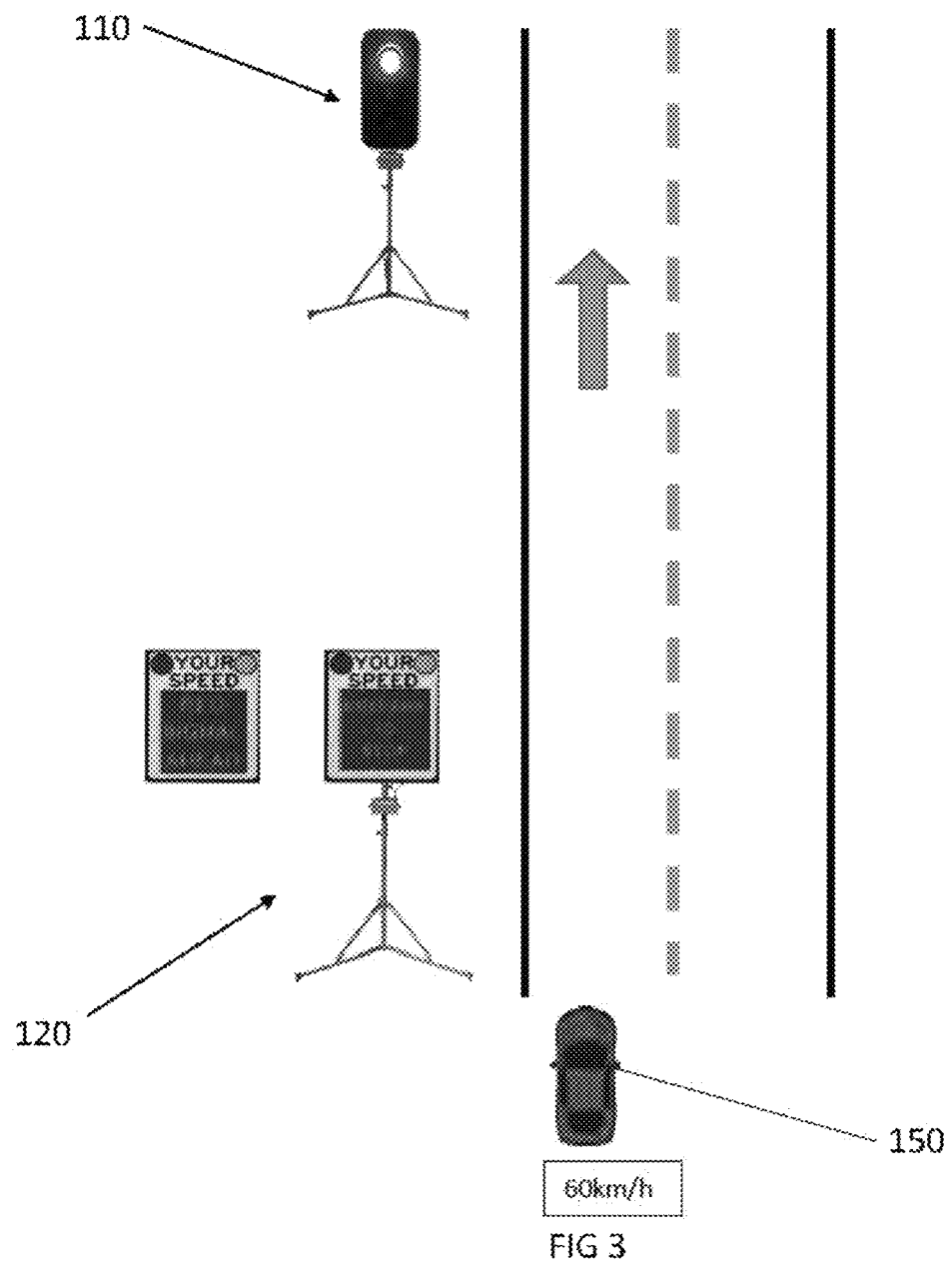
FIG. 3 shows a portable traffic management system comprising a portable signal assembly up road from a portable traffic signal assembly (STOP configuration), and an approaching motorist at the speed limit.

Shown in FIG. 3, a similar setup of the portable traffic signal assembly (110) and portable signal assembly 120 is shown. However, in this figure, the portable traffic signal assembly (110) is in a red light (STOP configuration). As a vehicle (150) approaches the portable signal assembly 120, a first detector detects the speed of the vehicle (150) (60 km/hr). The control unit recognizes that the vehicle is in accordance with the speed limit, but has also received a signal (via. The control unit) that the portable traffic signal assembly (110) is in a red light (STOP configuration). The portable signal assembly (120) then displays two messages (one after the other) that there is a 'red signal ahead' and to 'prepare to stop'.

Figure 4:
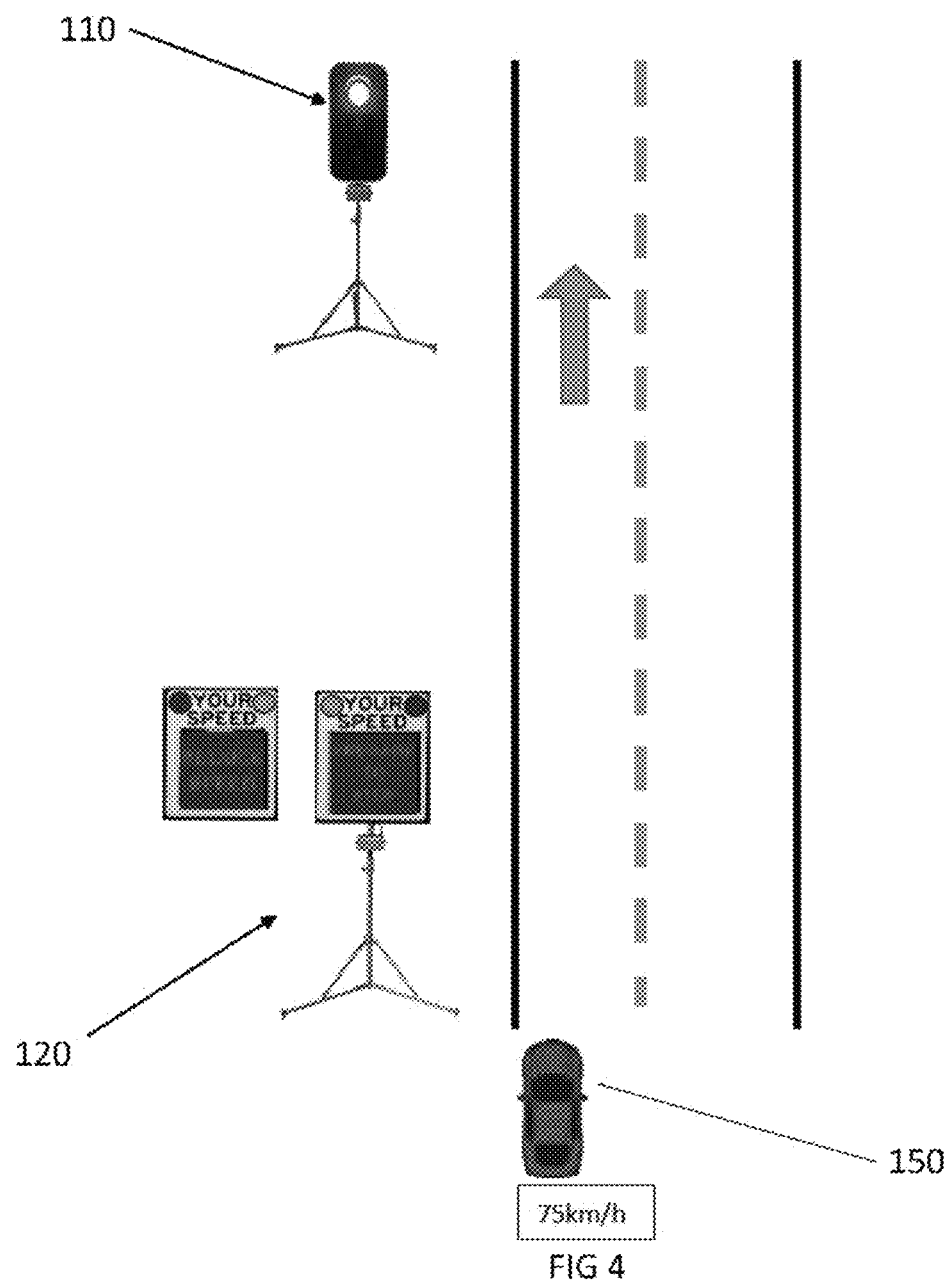
FIG. 4 shows a portable traffic management system comprising a portable signal assembly up road from a portable traffic signal assembly (STOP configuration), and an approaching motorist above the speed limit.

Shown in FIG. 4, a similar setup of the portable traffic signal assembly (110) and the portable signal assembly (120) is shown. The portable traffic signal assembly (110) is in the red light (STOP configuration). As a vehicle (150) approaches the portable signal assembly (120), a first detector detects the speed of the vehicle (75 km/hr). The control unit recognizes that the vehicle is not in accordance with the speed limit and also that the portable traffic signal assembly (100) is in a STOP configuration. The portable traffic signal assembly (120) then displays two messages (one after the other) that the vehicle should 'reduce speed' and to 'prepare to stop'.

The traffic management system may comprise one or more portable traffic signal assemblies. The traffic management system may also comprise one or more portable signal assemblies. In one embodiment, the traffic management system may comprise two traffic signal assemblies and two portable signal assemblies. In this embodiment, one portable traffic signal assembly and one portable signal assembly may be associated with one another, and the other portable traffic signal assembly and the other portable signal assembly may also be associated with one another. These sets of assemblies may be placed up road from the construction site, or the area in which a break in traffic is required, and control the flow in traffic in each direction. It will be appreciated that multiple portable traffic signal assemblies and/or multiple portable signal assemblies may be used to control traffic on a single lane. Each portable signal assembly will provide forewarning of the traffic conditions of the associated portable traffic signal assembly. Each portable traffic signal assembly will control the flow of traffic in one direction. Each portable traffic signal assembly will be in wireless communication with the control unit to ensure that a traffic accident is not caused. In this regard, if both traffic light assemblies are placed on a one lane then the two portable traffic light signal assemblies will not be in the GO configuration at the same time.

Each portable traffic signal assembly may have an associated boom gate. Each portable traffic signal assembly and/or portable traffic signal assembly may comprise a first detector and/or second detector.

The portable traffic signal assembly, the portable signal assembly and components thereof are as substantially described hereinabove.

The portable traffic signal assembly may be pre-programmed to change from a red, yellow or green light at predetermined intervals. However, the portable traffic signal assembly may also be manually changed from red, yellow or green. In this regard, the portable traffic management system may comprise a remote control that manually changes the configuration of the portable traffic signal assembly. In one embodiment, the remote control is in wireless communication with the portable traffic signal assembly and/or control unit. In another embodiment, the remote control comprises a waterproof housing. In one embodiment, the remote control is the control unit.

The remote control may be configured for a single portable traffic signal assembly or a pair of portable traffic signal assemblies. The following describes a remote control for a pair of portable traffic signal assemblies.

The remote control comprises an on/off button for turning the pair of portable signal assemblies on and off. The remote control may also comprise indicator lights indicating the configuration of a first portable traffic signal assembly and the configuration of a second portable traffic signal assembly. The remote control may also comprise a button for sending a GO configuration signal to the first portable traffic signal assembly (and an associated STOP configuration to the second portable traffic signal assembly), and a button for sending a GO configuration signal to the second portable traffic signal assembly (and an associated STOP configuration to the first portable traffic signal assembly). The remote control may further comprise a button for sending a STOP configuration signal to both the first portable traffic signal assembly and the second portable signal assembly. The remote control may further comprise a fault indicator for the first portable traffic signal assembly and a fault indicator for the second portable traffic signal assembly. The remote control may also comprise a status indicator. The status indicator upon start-up will show whether the portable traffic signal assemblies are synchronized. The remote control may also comprise an operation button. The operation button sends a signal to the control unit to begin operation of the two-directional traffic management system in an automated mode.

It will be appreciated that, in some instances, a break in traffic is required for extended periods of time. In this scenario, the remote control can be utilized to issue a STOP configuration signal to both traffic signal assemblies. In other circumstances, desired vehicle(s) may require access and, in this scenario, the remote control can be utilized to issue a GO configuration signal to the desired portable traffic signal assembly and, once the desired vehicle(s) have passed, issue a STOP configuration signal. It will be appreciated that this can all be completed remotely.

The control unit may also be configured to receive manual inputs in relation to the length of time of the GO configuration and STOP configuration, and/or whether the portable traffic signals assemblies are vehicle actuated. In the instance where the remote control is not the control unit, the remote control also allows for manual override of the programmed control unit. This allows a user to control the flow of traffic to their requirements. This again provides a safe working environment for construction workers and motorists.

The portable traffic signal assemblies may each further comprise a vehicle detection device. The control unit may be in wireless communication with the vehicle detection device. In this regard, the control unit receives a signal from the vehicle detection device (possibly via the portable traffic signal assembly) as to whether a vehicle is present in a queue at the portable traffic signal assembly. The control unit may then send a signal to each portable traffic signal assembly (either GO configuration or STOP configuration) to allow the vehicle(s) to proceed. The control unit may skip a green light (GO configuration) if it is detected that there is no vehicle queue at a red signal. A non-limiting example of the vehicle detection device includes radar detection. In one embodiment, the vehicle detection unit may be in communication with the control unit via the portable traffic signal assembly.

In one embodiment, the portable traffic management system and components thereof are connected to a network. In one embodiment, all the components of the traffic management system are in wireless communication.

In one embodiment, the control unit may be a central cloud control unit. The central cloud control unit is accessible via the internet and is able to control the portable traffic management system remotely. In one embodiment, the central cloud control unit may only be in communication with the portable signal assembly and the portable traffic signal assembly. The central cloud control unit may receive information from the components of the portable signal assembly and the portable traffic signal assembly therethrough. In another embodiment, the central cloud control unit may be in communication with all the components of the portable traffic management system. In this regard, the central cloud control unit may collect, store and process data provided by the portable signal assembly and the portable traffic signal assembly and provide instructions thereto. This can include camera recording storage, setting and displays on signs, changing the automated traffic signal parameters, sending alarm signals, track valuable equipment, record location of each device and also asset management.

Figure 5:
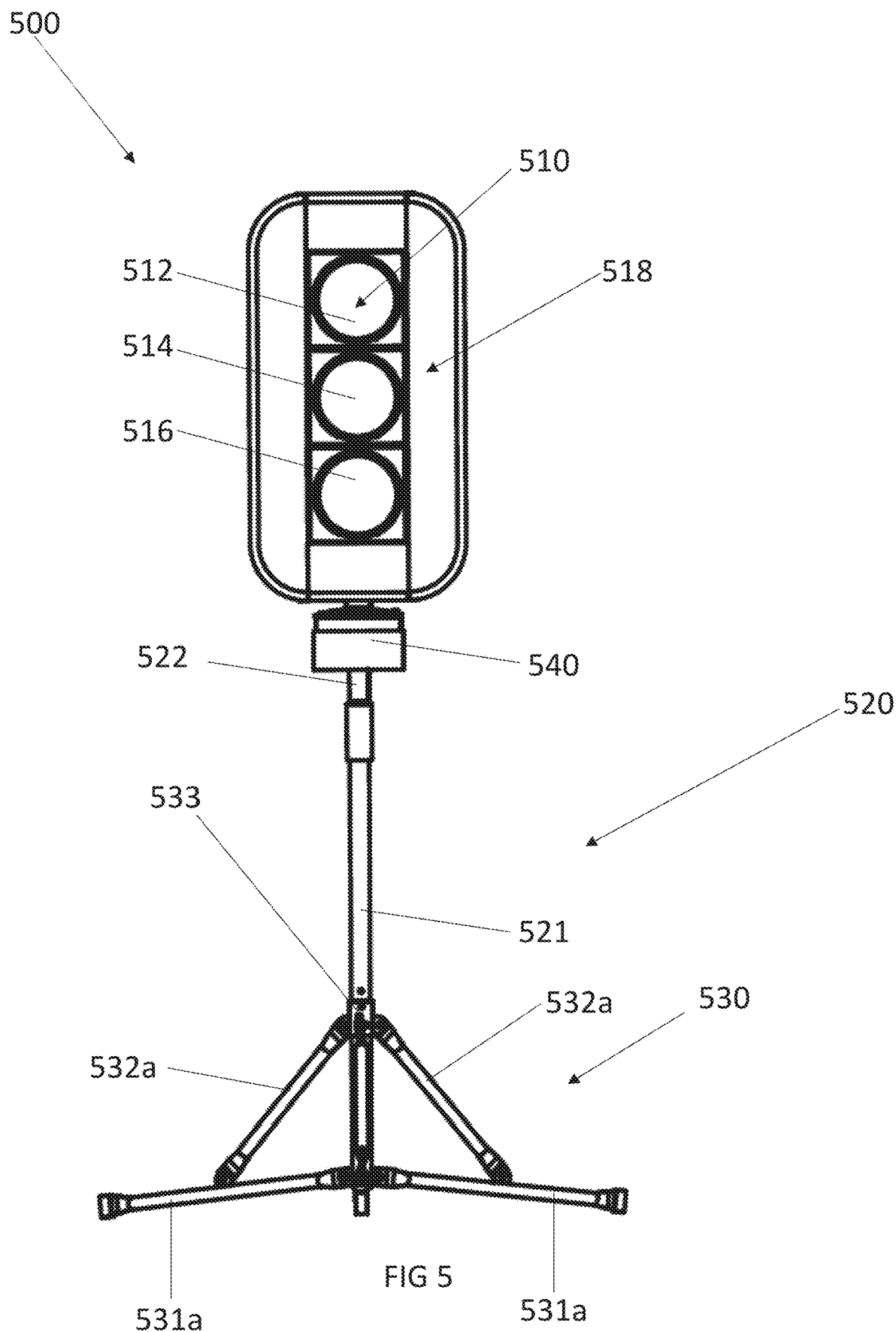
FIG. 5 shows a portable traffic signal assembly.

Shown in FIG. 5 is one embodiment of a portable traffic signal assembly. The portable traffic signal assembly (500) may also comprise a support assembly (520) adapted to receive the traffic lantern (510). The support assembly (520) is adapted to releasably receive the traffic lantern (510). Preferably, the support assembly (520) is an elongate support assembly. More preferably, the support assembly (520) is a collapsible support assembly.

The support assembly (520) further comprises an upper support member (522) and a lower support member (521). The support assembly (520) further comprises a base assembly (530).

The base assembly (530) includes three support legs (531a), three stays (532a) and a fastening collar (533). The fastening collar (533) is located about the lower support member (521) of the support member.

The support legs (531a) are pivotally coupled to an end of the lower support member (521) and are spaced about the lower support member (521) at approximately 120° relative to each other to provide a stable support. While the embodiments herein have been described as having three (3) support legs, it will be appreciated that additional support legs could be included to further improve stability.

Each leg (531a) includes a stay (532a), one end of which is pivotally coupled to the fastening collar (533). At an opposite end, each stay is pivotally coupled to the centre of its respective leg.

The support legs (531a) can be folded vertically by moving the feet of the support legs (531a) and the fastening collar (533) along the lower support member (521). The fastening collar (533) has a fastening screw (not shown) or other suitable mechanism for locking the fastening collar (533) in place along the lower support member (521).

An end of the upper support member (522) is received within an end of the lower support member (521) to couple the upper and lower support members (522, 521) together.

The feet comprise hollow cylindrical portions which may receive pegs or other suitable tie-down devices used to secure the base assembly to the ground or a supporting surface.

A battery may also be located in a receptacle (540) connected to the upper support member (522). The battery may be connected to the traffic lantern (510) to provide power thereto. In some embodiments, the battery may be replaced with solar panels or used in combination with solar panels. In an embodiment, the battery is a rechargeable battery.

Figure 6:
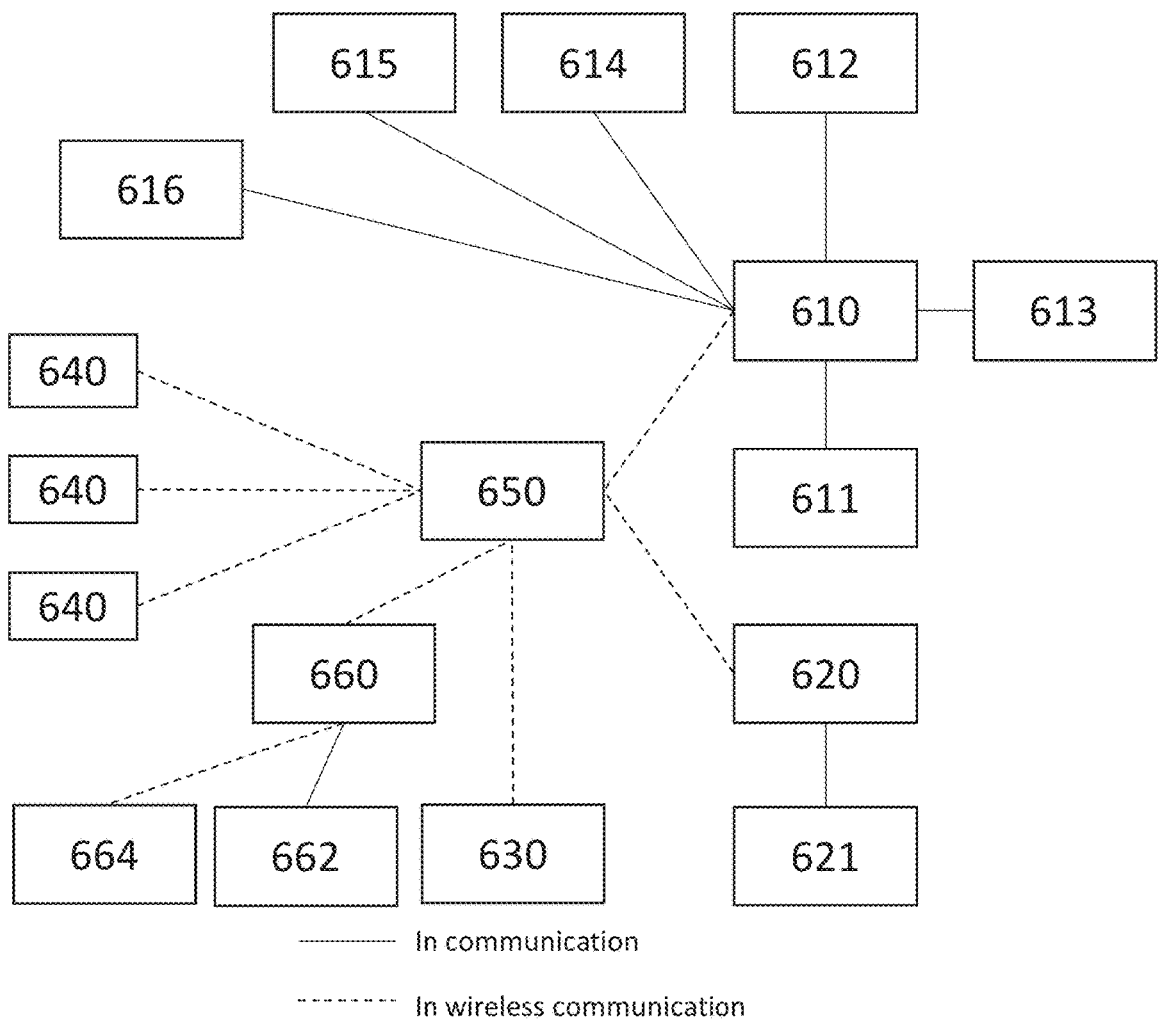
FIG. 6 shows a schematic of one embodiment of the traffic management system.

Shown in FIG. 6 is shown a schematic of an embodiment of a portable traffic management system. Please note that the dotted lines denote wireless communication and the complete lines denote their association (such as being in direct communication). The traffic management system comprises a control unit (650) in wireless communication with a portable traffic signal assembly (610) and a portable signal assembly (620).

The portable traffic signal assembly (610) is in communication with a boom gate (611). The boom gate (611) is not wirelessly connected to the portable traffic signal assembly (611). The boom gate (611) actuates depending on the configuration of the portable traffic signal assembly (610).

The portable signal assembly (620) comprises a first detector (621) for detecting the speed of a vehicle. The first detector (621) is in communication with the portable signal assembly (620). The first detector (621) may send a signal to the portable signal assembly (620) of the speed of an approaching vehicle. The portable signal assembly (620) then compares the speed of an approaching vehicle with a predetermined speed limit.

The portable traffic signal assembly (610) comprises a second detector (612) for detecting a vehicle running a red light. The second detector (612) is in communication with the portable traffic signal assembly (610). The second detector (812) may send a signal via the portable traffic signal assembly (610) to the control unit (650) of a vehicle running a red light.

The portable traffic signal assembly (610) further comprises a red light indicator (613). The red light indicator (613) is not in communication with the control unit (650). However, it will be appreciated that the red light indicator (613) may be in wireless communication with the control unit (650).

The portable traffic signal assembly (610) may be further comprise an adjustable camera (614). The adjustable camera (614) is in communication with the portable traffic signal assembly (610).

The portable traffic signal assembly (610) further comprises a tilt and rotation alarm (615). The tilt and rotational alarm (615) is in communication with the portable traffic signal assembly (610). The tilt and rotational alarm (615) can send a signal via the associated portable traffic signal assembly (610) to the control unit (650) of when the portable traffic signal assembly (610) is in an orientation that has deviated from its original position.

The first portable traffic signal assembly (610) further comprises a first vehicle detection device (616). The vehicle detection device (616) is in communication with the portable traffic signal assembly (610). The vehicle detection device (616) may send signals via the associated portable traffic signal assembly (610) to the control unit (650) as to whether there is a vehicle in the queue waiting for the portable traffic signal assembly.

The traffic management system may further comprise an alarm system (630). The alarm system is in wireless communication with the control unit (650). The alarm system (630) issues a warning upon receiving a signal regarding possible dangerous conditions.

The traffic management system may further comprise one or more wearable devices (640). The one or more wearable devices (640) may be in wireless communication with the control unit (650). The one or more wearable devices (640) issues a warning upon receiving a signal regarding possible dangerous conditions.

The portable traffic management system further comprises a display assembly (660). The display assembly (660)

is in wireless communication with the control unit (650). The display assembly (660) comprises a vehicle identification device (662). The display assembly (660) is in communication with the vehicle identification device (662). In one embodiment, the vehicle identification device (662) is in direct communication, or hardwired, with the display assembly (660). The display assembly (660) in also in wireless communication with a second vehicle identification device (664). The vehicle identification device (662) and second vehicle identification device (664) are configured to records unique vehicle credentials. The vehicle identification device (662) and the second vehicle identification device (664) are configured to send the unique vehicle credentials to the display assembly (660)

Figure 7:
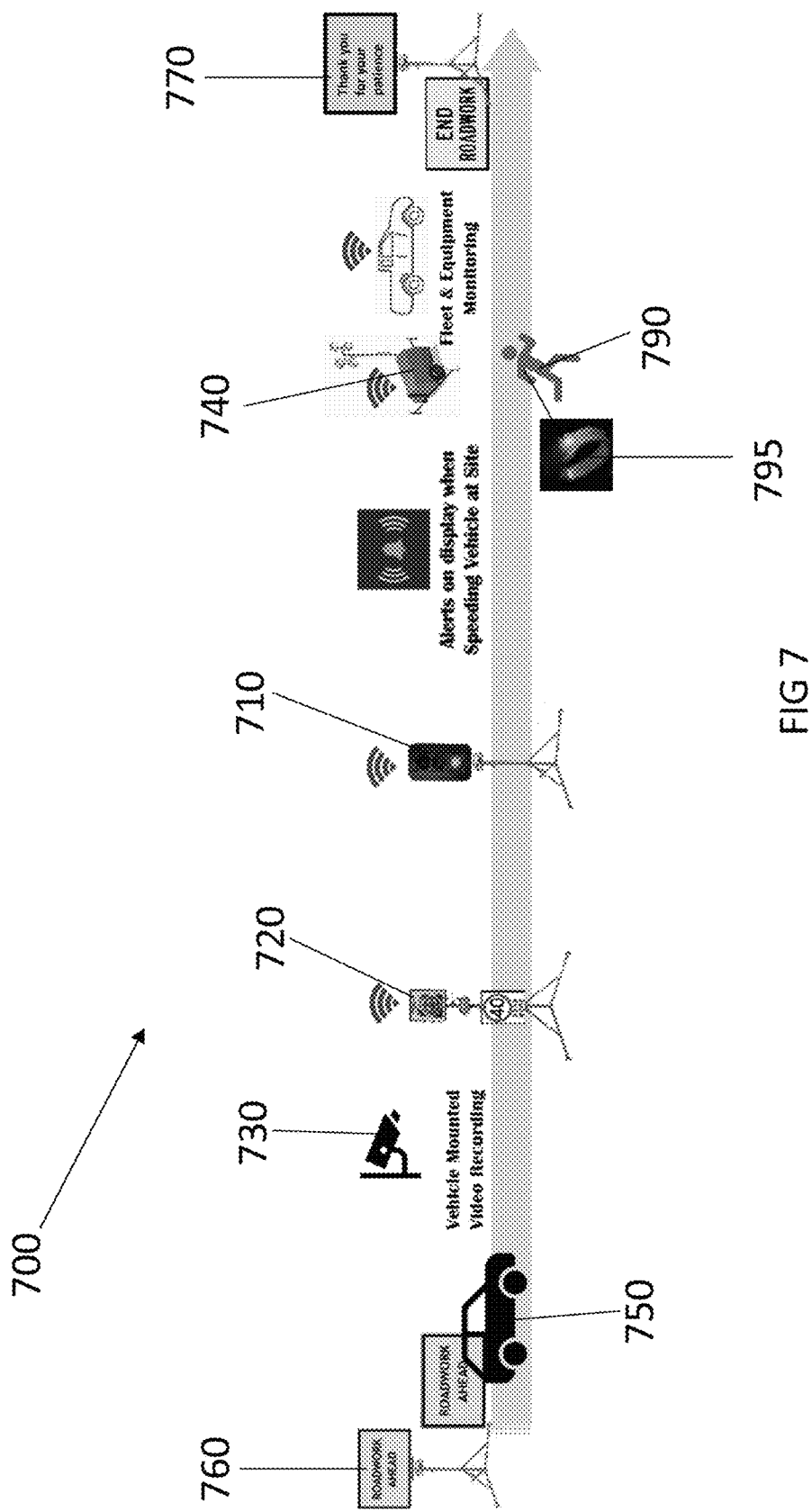
FIG. 7 shows a layout of one embodiment of the traffic management system.

Shown in FIG. 7 is an embodiment of a portable traffic management system (700). The portable traffic management system (700) comprises a portable traffic signal assembly (710) and a portable signal assembly (720) up road thereof. A camera (730) may also be present near the portable signal assembly (720). The camera (730) is vehicle mounted. The portable traffic signal assembly (710) is placed up road from roadworks or where a cease in traffic is required. The roadworks are generally located where worker (790) is located. The worker (790) is wearing a wearable device (795). Adjacent or near the roadworks is located an alarm system (740). The portable traffic signal assembly (710), portable signal assembly (720), camera (730) and alarm system (740) are in wireless communication with a control unit (not shown).

The portable signal assembly (720) comprises a first detector (not shown) for detecting the speed of a vehicle. The portable traffic signal assembly (710) comprises a second detector (not shown) for detecting a vehicle running a red light. The first detector and second detector are in wireless communication with the control unit (via the portable signal assembly and the portable traffic signal assembly, respectively).

As a vehicle (750) approaches the portable signal assembly (720), the first detector of the portable signal assembly (720) detects the speed of the vehicle (750). The control unit receives a signal from the first detector (via the portable signal assembly) and the configuration of the portable traffic signal assembly (710) therefrom, and issues a signal to the portable traffic signal assembly (710) of a message to be displayed. Alternatively, the portable signal assembly (720) receives a signal from the first detector and the configuration of the portable traffic signal assembly (via the control unit) and determines the message to be displayed. In the present scenario, the portable traffic signal assembly (710) is in the GO configuration (green light) and the vehicle (750) is in accordance with the speed limit, and so the portable signal assembly (720) displays a smiley face (denoting that a green light is ahead and the vehicle is in accordance with the speed limit).

If, however, the first detector detected that the speed of the vehicle was excessive then a signal is sent to the control unit (via the portable signal assembly) and in turn to the alarm system (740) and/or the wearable devices (795). In such a situation, the alarm system (740) and the wearable devices (795) would issue a warning (such as a visual, audio or tactile warning). The workers (790) would then be aware of possible dangerous conditions and evacuate the area.

After the vehicle (750) has passed the portable signal assembly (720), the vehicle approaches the portable traffic signal assembly (710). The second detector of the portable traffic signal assembly (710) detects whether the vehicle (750) is running a red light. If the second detector detects that the vehicle (750) is running a red light then a signal is sent to the control unit (via the portable traffic signal assembly) and in turn the alarm system (740) and/or the wearable devices (795). In such a situation, the alarm system (740) and wearable devices (795) worn by the workers (790) would issue a warning, and the workers would then be aware of possible dangerous conditions and evacuate the area.

The camera (730) takes video clips and/or photos of traffic. The camera (730) may be in wireless communication with the control unit and/or an external database (not shown), such as in the cloud. This information can be utilized for live updates of the traffic conditions. This information may also be utilized for historic data speed or traffic patterns. Furthermore, this information can be utilized to identify a vehicle that was travelling at excessive speeds or running a red light.

The portable traffic management system (700) may also comprise a display assembly (760). The display assembly (760) comprises a vehicle identification device (not shown). The display assembly (760) is in wireless communication with a second identification device (not shown). The display assembly (760) is configured to display a message regarding traffic conditions (as shown, 'roadworks ahead') when there is no vehicle queue. Alternatively, when there is a vehicle queue, the display assembly (760) is configured to determine a wait time, and display a message relating to the wait time.

The portable traffic management system (700) may further comprise a message display (770). The message display (770) is placed downroad from the roadworks and portable traffic signal assembly (710). The message display (770) displays a message that informs the motorist that they have passed the roadworks. For example, the message display may display one or more messages. Such messages include, but are not limited to, 'Thank you for your patience' and 'End Roadworks'.

In this embodiment, the control unit is suitably a cloud based control unit. In this regard, the control unit is only wirelessly connected with the portable traffic signal assembly and a portable signal assembly. The second detector, adjustable camera, vehicle detection device, tilt and rotation alarm, vehicle detection device, boom gate are all in communication with the portable traffic signal assembly which in turn is able to communicate this information wirelessly to the control unit. Similarly, the first detector is in communication with the portable signal assembly which in turn is able to communicate all information wireless to the control unit. Furthermore, the wearable devices are in wireless communication with the alarm system and can receive a warning therefrom in relation dangerous conditions. The alarm system is in wireless communication with the control unit and can receive a warning therefrom in relation to dangerous conditions.

Figure 9:
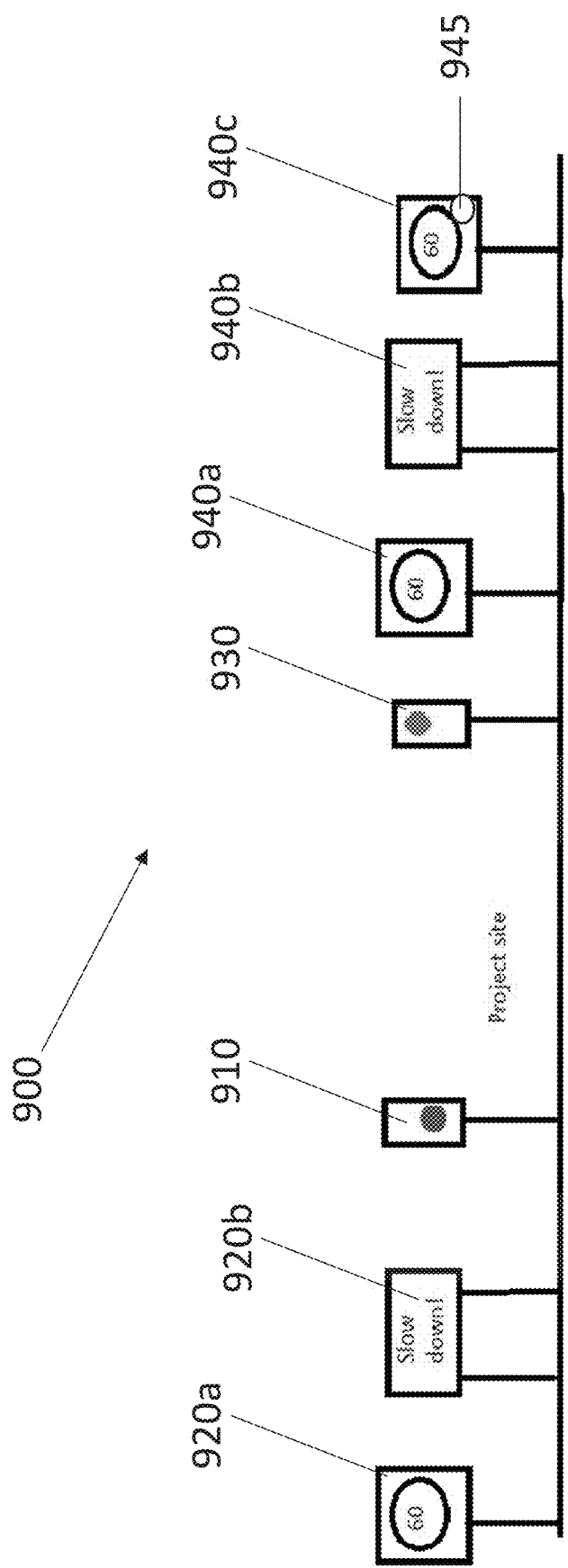
FIG. 9 shows another embodiment of the traffic management system.

FIG. 9 illustrates another embodiment of the traffic management system (900). The traffic management system (900) comprises a first portable traffic signal assembly (910) and an associated pair of portable signal assemblies (920*a* and 920*b*). The traffic management system (900) further comprises a second portable traffic signal assembly (930) and associated portable signal assemblies (940*a*, 940*b*, 940*c*). As shown, portable signal assemblies (920*a*, 940*a* and 940*c*) are adapted to show the speed limit, and portable signal assemblies (920*b* and 940*b*) are adapted to display a message.

When an operator sets up the traffic management system, they first determine the position of the device or assembly in the traffic management system. In this regard, the operator will need to compose the rule set to determine how the device behaves and activates.

For example, in the embodiment shown, at least portable signal assemblies (920*a* and 940*c*) comprise a detector (such as a radar) for determining the speed of an incoming vehicle. The portable signal assembly (920*b*) may then issue a message for the vehicle to slow down if they are exceeding the speed limit (as shown, 60 kph). Similarly, the portable signal assembly (940*b*) issues a message for the vehicle to slow down if they are exceeding the speed limit. The portable signal assembly (940*a*) further reiterates the speed limit. The first portable traffic signal assembly (910) and the second portable traffic signal assembly (930) issue either red light signals and green light signals.

The operator will need to set up rules such that the first portable traffic signal assembly (910) and the second traffic portable signal assembly (930) do not both shown green lights at the same time. The rules may include a delay between a change from green light to red light to ensure that all traffic has passed. The operator may also set up rules regarding the messages issued by the portable signal assemblies, such as changing portable signal assembly (940*b*) to show the speed limit, portable signal assembly (940*c*) to display a message that roadworks are ahead, and portable signal assembly (940*a*) to show that a traffic light is coming up. The use of multiple portable signal assemblies allows for the messages to be more targeted towards the motorist. In this regard, if the motorist has not corrected their driving behaviour in accordance with the speed limit then a particular message may be shown.

The rules input by the operator can be inputted in the central cloud control unit. The central cloud control unit saves the rules. The central cloud control unit transfers the rules to the associated devices via a secured connection (TCP connection). Once the rules have been sent to the devices, the operator will be provided with a notification. In the event that the rules are not transferred successfully, an error message will be issued to the operator to highlight the potential problem of possible network issues or device availability.

The present system allows for multiple new devices to be inserted into the device ecosystem, or for devices to be removed from the device ecosystem. The rules and how the remaining devices in the ecosystem can be monitored remotely and easily changed. The present system allows for easy modification of the traffic management system. Furthermore, the operator may review collected data from the traffic management system via the central cloud control unit.

It will be appreciated that multiple ecosystems may be present, and that these can function concurrently. For instance, the control unit may comprise multiple entities that can adjust the rules. Each entity may be ascribed a different amount of function to the rules of the devices. In this regard, a hire company may ultimately own a number of devices that form part of a traffic management system. The hire company may lease these devices to a company. The company may then have access to some of the rules of the devices, and modify them accordingly. However, upon the lease ending, the company may have their rights revoked and the hire company suitably has access to the rules. In another embodiment, the hire company may have access to the rules at all times.

Shown in FIG. 10 is an example ecosystem of the traffic management system (1000). In one embodiment, traffic management system (1000) comprises a control unit (1010). In an embodiment, the control unit is a cloud control unit adapted to receive information and data from a number of components of the traffic management system (1000). The traffic management system (1000) further comprises a portable traffic light signal (1020). The portable traffic signal assembly (1020) is as described herein above. The portable traffic signal assembly (1020) is adapted to issue a green light or a red light, or optionally a yellow light signal to a motorist. The portable traffic signal assembly (1020) is adapted to send a status thereof (green, red or optionally yellow light) to the control unit (1010). Additionally, the control unit (1010) may be adapted to issue a signal to the portable traffic signal assembly (1020) to issue a red light or a green light, or optionally a yellow light.

The traffic management system (1000) further comprises a number of portable signal assemblies (1030*a*, 1030*b*, 1030*c*). In the embodiment shown, portable signal assembly (1030*a*) is adapted displays the speed limit of the road. The speed limit is suitably set by the control unit (1010). In one embodiment, the portable signal assembly (1030*a*) comprises a first detector for detecting the speed of a vehicle (not shown). The first device and/or portable signal assembly are in communication with the control unit (1010). The portable signal assembly (1030*b*) is adapted to display a message. The portable signal assembly (1030*b*) may comprise a second detector for detecting the speed of a vehicle (not shown). The portable signal assembly (1030*b*) and the second detector are in communication with the control unit (1010). The control unit (1010) compares the speed of the vehicle received from the second detector with the speed limit, and issues a signal for the portable signal assembly (1030*b*) to display a signal denoting compliance with the speed limit or non-compliance with the speed limit (in the diagram, compliance with the speed limit is observed). The portable signal assembly (1030*c*) is adapted to display a message. The portable signal assembly (1030*c*) may comprise a third detector for detecting the speed of a vehicle (not shown). The portable signal assembly (1030*c*) and the third detector are in communication with the control unit (1010). The control unit (1010) compares the speed of the vehicle received from the third detector with the speed limit, and issues a signal for the portable signal assembly (1030*c*) to display a signal denoting compliance with the speed limit or non-compliance with the speed limit. In the embodiment shown, the vehicle has increased it speed and so the control unit (1010) issues a signal to the portable signal assembly (1030*c*) to display a message of 'reduce speed'.

The control unit (1010) can be accessed by a number of users, such as the site control tablet (1041), depot management laptop (1042) fleet management PC (1043), and/or a smart phone (1044). The site control tablet (1041), depot management laptop (1042) and fleet management PC (1043) may have differing access to setting the rules of the traffic management system (1000).

The traffic management system (1000) may further comprise an alarm system (1045), a wearable device (1095) adapted to be worn by a worker (1090), and a location determining device (1055) adapted for third party vehicles (1050). The alarm system (1045), wearable device (1095) and location determining device (1055) are in wireless communication with the control unit (1010). The control unit (1010) is adapted to issue a response to the alarm system (1045), the wearable device (1095) and the location determining device (1055) when dangerous conditions are established. The alarm system (1045), wearable device (1095) and location determining device (1055) are adapted to issue a warning to warn the nearby workers, the workers wearing the wearable devices and/or the driver of the third party vehicle.

The wearable device (1095) is adapted to transmit a location or movement thereof to the control unit (1010). The location determining device (1055) is adapted to transmit the location or movement thereof to the control unit (1010). The control unit (1010) is adapted to receiving location data and establish dangerous conditions when a wearable device (1095) is in close proximity of a location determining device (1055), or when the movement of the wearable device (1095) and/or the movement of a location determining device (1055) may lead to dangerous conditions.

The portable traffic management system (1000) may further comprise a message display (1060). The message display (1060) is placed downroad from the roadworks and portable traffic signal assembly (1020). The message display (1060) displays a message that informs the motorist that they have passed the roadworks. In one embodiment, the message display (1060) may be in the form of a portable signal assembly.

Figure 8:
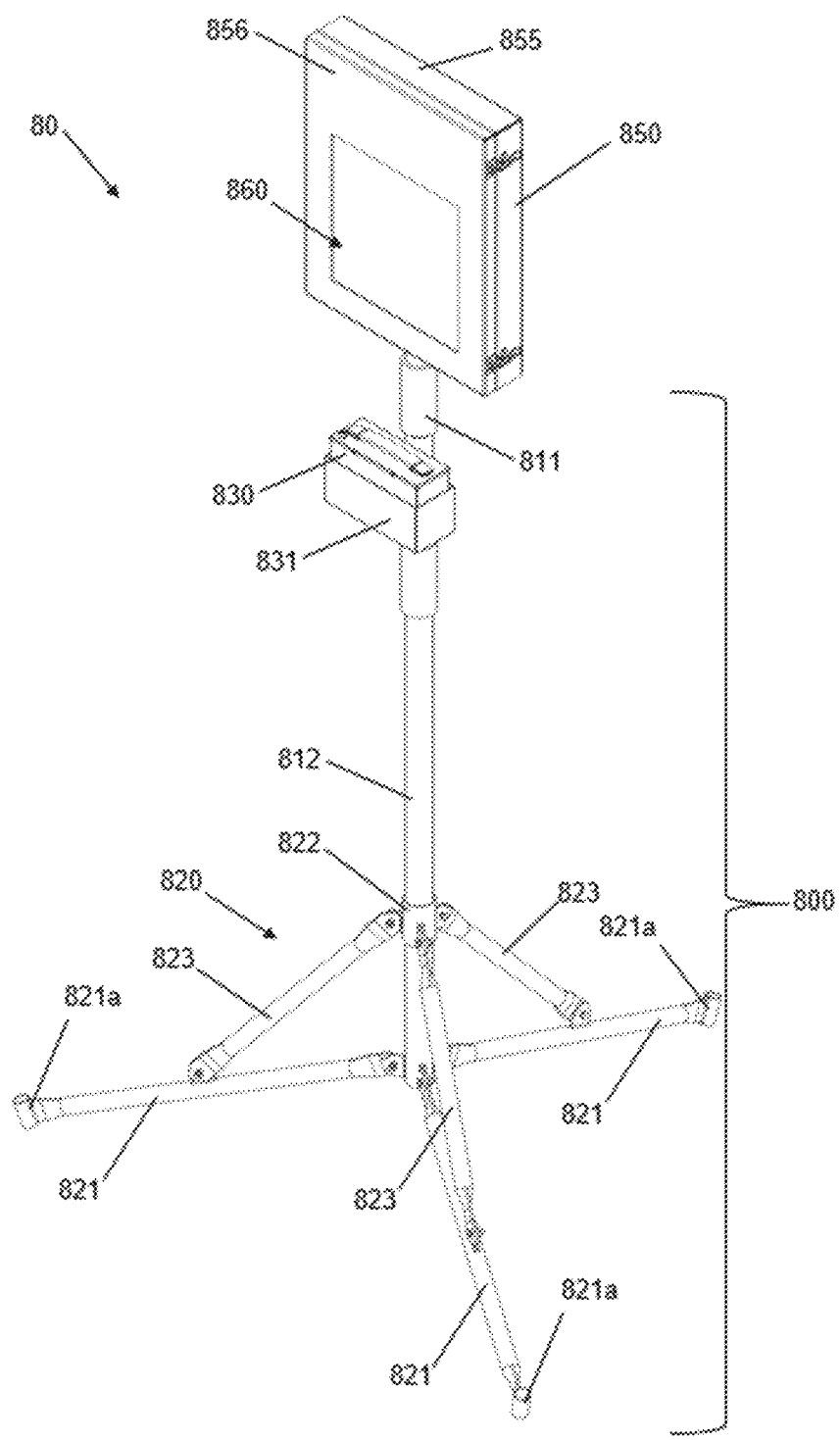
FIG. 8 shows a portable signal assembly.

FIG. 8 illustrates a perspective view of a portable signal assembly (80). The apparatus (80) includes a collapsible support assembly (800) and a speed awareness monitor (850).

The collapsible support assembly (800) includes an elongate support defined by an upper support member (811) and a lower support member (812). The lower support member (812) may suitably be disconnected with the upper support member (811).

The upper support member (811) is adapted to releasably receive the speed awareness monitor (850) at an end such that the portable signal assembly (850) is located at the highest point of the apparatus (80) when fully assembled and erected.

The collapsible support assembly (800) also includes a base assembly (820) connected to the elongate support, which can be seen in FIG. 8.

The base assembly (820) includes three support legs (821), three stays (823) and a fastening collar (822).

The fastening collar (822) is located about the lower support member (812) of the elongate support.

The support legs (821) are pivotally coupled to an end of the lower support member (812) and are spaced about the lower support member (812) at approximately 120° relative to each other to provide a stable support. While the embodiments herein have been described as having three support legs, it will be appreciated that additional support legs could be included to further improve stability.

Each leg (821) includes a stay (823), one end of which is pivotally coupled to the fastening collar (822). At an opposite end, each stay (823) is pivotally coupled to the centre of its respective leg (821).

The support legs (821) can be folded vertically by moving the feet (821*a*) of the support legs (821) and the fastening collar (822) along the lower support member (812). The fastening collar (822) has a fastening screw (not shown) or other suitable mechanism for locking the fastening collar (812) in place along the lower support member (812).

An end of the upper support member (811) is received within an end of the lower support member (812) to couple the upper and lower support members (811, 812) together.

The feet (821*a*) comprise hollow cylindrical portions which may receive pegs or other suitable tie-down devices used to secure the base assembly (820) to the ground or a supporting surface.

As can be seen in the figures, a rechargeable battery (830) is located in a receptacle (831) connected to the upper support member (812). In use, the battery (830) is connected to the speed awareness monitor (850) to provide power thereto. In some embodiments, the battery (830) may be replaced with solar panels or used in combination with solar panels.

The present traffic management system provides multiple safety features. For instance, the first detector provides an initial warning of excessive vehicle speeds. The second detector provides a warning or further warning if a vehicle is detected running a red light. The alarm system and wearable devices will issue a warning in response to either of the above circumstances and allows the workers to evacuate the area to avoid harm. It should be clearly appreciated that the present portable traffic management system provides significant advantages over the traffic management systems of the prior art.

The wireless nature of the portable traffic management system also allows for remote fleet and equipment monitoring. This is more efficient and safer for operators to complete as they do not need to travel to the site, and are not exposed to possible dangerous traffic conditions.

The portable traffic management system provides a traffic management system with driver interaction for situational specific feedback. In this regard, the portable traffic management system can be modified to display a number of messages or images depending on the situation. Furthermore, the portable traffic management system further alleviates the problem of possible injury by being connected to an alarm system and/or one or more wearable devices. In this regard, when dangerous situations are detected (such as a red light jumping vehicle and/or excessive vehicle speed) then the alarm system and wearable devices will provide forewarning of such an event so that the construction workers can evacuate the area and reduce the risk of harm. The portable signal assembly is also able to reiterate speed limits and deliver messages in relation to traffic conditions ahead.

The portable traffic management system improves the safety for motorists and construction workers in the area. Furthermore, the portable traffic management system may be on a network such that online access to site data and equipment is possible.

The wireless connectivity of the traffic management system allows an operator to be far away from the traffic. This provides a further safety feature and alleviates the problem of an operator being hit by traffic. Furthermore, the present system may be pre-programmed with fail safes to ensure that traffic accidents are not accidentally caused.

As used herein, the term 'wireless communication' refers to any communication that is wireless. Non-limiting examples of 'wireless communication' include 3G/4G/5G connection, LoRa and/or LoRaWAN network. It will be appreciated that wireless communication between 3G/4G/5G, LoRa or LoRaWAN network may be susceptible to breaks in connectivity (e.g., due to connectivity issues, distance or loss of service), and so the traffic management system may interchange between the three to ensure that no significant loss of connectivity is encountered between the components of the traffic management system. In this regard, any device of the traffic management system may act as a relay for the remaining devices of the traffic management system.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A portable traffic management system comprising:
a portable traffic signal assembly adapted to display at least a red light signal or a green light signal;
a portable signal assembly comprising a first detector for detecting a speed of a vehicle;
a control unit in wireless communication with the portable traffic signal assembly and the portable signal assembly, wherein the control unit receives a status of the portable traffic signal assembly and the speed of the vehicle and, in response, issues a signal to the portable signal assembly to display a message based thereon;
an alarm system in wireless communication with the control unit; and
one or more wearable devices in wireless communication with at least one of the control unit or the alarm system,
wherein the alarm system and the one or more wearable devices are configured to issue a warning of imminent dangerous conditions in response to the first detector detecting excessive vehicle speed.

2. The portable traffic management system of claim 1, wherein the portable signal assembly is configured to display one or more messages.

3. The portable traffic management system of claim 2, wherein the portable traffic signal assembly comprises a second detector for detecting the speed of a vehicle.

4. The portable traffic management system of claim 3, wherein at least one of the first detector or the second detector is in wireless communication with the control unit.

5. The portable traffic management system of claim 1, wherein the portable traffic signal assembly comprises a second detector for detecting a vehicle running a red light.

6. The portable traffic management system of claim 1 further comprising a boom gate in communication with at least one of the control unit or the portable traffic signal assembly.

7. The portable traffic management system of claim 6, wherein the boom gate is configured to actuate in response to at least one of the portable traffic signal device or the control unit.

8. The portable traffic management system of claim 1 further comprising a remote control that controls the portable traffic signal assembly.

9. The portable traffic management system of claim 1 wherein the portable traffic signal assembly further comprises an adjustable camera.

10. The portable traffic management system of claim 1, wherein at least one of the alarm system, the portable traffic signal assembly or the portable signal assembly further comprises a red light indicator.

11. The portable traffic management system of claim 1, wherein the control unit is configured to send a signal to the portable signal assembly to display at least one of a particular message or messages.

12. The portable traffic management system of claim 1, wherein at least one of the portable traffic signal assembly or the portable signal assembly further comprises a tilt and rotation alarm.

13. The portable traffic management system of claim 1, further comprising a display assembly in communication with a vehicle identification device and a second vehicle identification device.

14. The portable traffic management system of claim 13, wherein the display assembly is configured to display the wait time.

15. The portable traffic management system of claim 1, wherein all components thereof are in wireless communication.

* * * * *